(12) United States Patent
Aholainen (10) Patent No.: US 7,565,158 B1
(45) Date of Patent: Jul. 21, 2009

(54) PUSH PAGE USER INTERFACE IN A SHORT RANGE RADIO ENABLED MOBILE TERMINAL

(75) Inventor: Markus Aholainen, Pirkkala (FI)

(73) Assignee: Nokia Corporation, Espoo (FI)

( * ) Notice: Subject to any disclaimer, the term of this patent is extended or adjusted under 35 U.S.C. 154(b) by 727 days.

(21) Appl. No.: 10/107,179

(22) Filed: Mar. 28, 2002

(51) Int. Cl.
- H04W 68/00 (2009.01)
- H04M 3/42 (2006.01)
- H04M 1/66 (2006.01)
- H04B 7/00 (2006.01)
- H04M 1/68 (2006.01)

(52) U.S. Cl. ............. 455/458; 455/410; 455/414.1; 455/41.2

(58) Field of Classification Search ........... 455/456.3, 455/414.2, 41.2, 41.3, 414.1, 414.3, 414.4, 455/458, 426.1, 515, 410, 411; 340/7.24–7.29, 340/311.2
See application file for complete search history.

(56) References Cited

U.S. PATENT DOCUMENTS

| | | | |
|---|---|---|---|
| 5,842,141 A | 11/1998 | Vaihoja et al. | 455/574 |
| 6,065,058 A | 5/2000 | Hailpern et al. | 709/231 |
| 6,122,348 A * | 9/2000 | French-St. George et al. | 379/88.23 |
| 6,311,206 B1 | 10/2001 | Malkin et al. | 709/202 |
| 6,314,108 B1 | 11/2001 | Ramasubramani et al. | 370/465 |
| 6,640,097 B2 * | 10/2003 | Corrigan et al. | 455/414.1 |
| 6,925,307 B1 * | 8/2005 | Mamdani et al. | 455/466 |
| 7,130,616 B2 * | 10/2006 | Janik | 455/412.1 |

FOREIGN PATENT DOCUMENTS

| | | |
|---|---|---|
| EP | 1 035 690 A2 | 9/2000 |
| WO | 99/33293 | 1/1999 |
| WO | 01/22669 A1 | 3/2001 |
| WO | WO 01/78320 A2 | 10/2001 |
| WO | WO 01/78342 A2 | 10/2001 |

OTHER PUBLICATIONS

Partial Search Report (Dec. 10, 2003).
Simon Gawne : "Part II: Bluetooth—The Technical Details", Dec. 19, 2000, pp. 1-7, XP002315283, retrieved from the internet: http://technoline.com/community/related_content/11765.
Pekka Jäppinen: "Bluetooth wireless technology based guidance system", Lappeenranta University of Technology, Thesis, Oct. 4, 2001, pp. 1-63, XP002315181, retrieved from the Internet: http://edu.lut.fi/LutPub/web/nbnfi-fe20011575.pdf.

* cited by examiner

*Primary Examiner*—Eugene Yun
(74) *Attorney, Agent, or Firm*—Locke Lord Bissell & Liddell (57) ABSTRACT

A wireless mobile terminal allows a user to control receiving of location based push-type transmissions using a menu driven interface. The terminal includes a storage device maintaining dedicated push pages, wherein the pages are used when receiving location based push-type transmissions by the terminal. A controller activates a short range RF transceiver module using a selected dedicated push page, which enables reception of selected location, based push-type transmissions when the push information matches the dedicated push page in the terminal.

34 Claims, 5 Drawing Sheets

PUSH PAGE USER INTERFACE IN A SHORT RANGE RADIO ENABLED MOBILE TERMINAL

BACKGROUND OF INVENTION

1. Field of Invention

This invention relates to mobile terminals receiving push-type information in a short-range radio communication. More particularly, the invention relates to a push page user interface that allows a user to easily control receiving location based push-type RF transmissions in a short-range communication system.

2. Description of Prior Art

The current way of receiving push-type information in short range communication systems is by turning different settings on and off in the terminal. The setting process is not user friendly. Typically, users want to use services as seamlessly and trivially from his/her point of view as possible. Users do not want push messages or connection requests to appear during other uses of the device. Nor do the users want to set the terminal to accept push content or connection requests. What is needed is seamless, trivial, and automatic acquisition of push content in a mobile terminal, via a menu driven user interface that allows a user to easily control receiving location based push-type RF transmissions in a short-range communication system.

Prior art related to controlling push type transmissions in short range radio enabled mobile terminal includes:

1) U.S. Pat. No. 6,065,058 issued May 16, 2000 discloses push-based filtering of objects in a client-server hierarchy based on usage information. A method of annotating a push object with meta information on its content and/or urgency is also described. Objects can be staged at the server(s) to provide fast access when the filtered object is later requested. The *Platform For Interconnect Content Selection (PICS) Rules* protocol may be used to communicate various types of information: e.g., by the content provider or a higher level proxy to annotate the object, including an urgency, a summary or title, a group classification, and/or an identity of the push; to convey usage or preference information on pushed objects up the hierarchy, including usage information and user preferences based on object group classifications; and to convey a staging status of each staged object down the hierarchy to improve caching efficiency. An object may include a content hierarchy such as a title, a summary and the full content. The filtering process can factor in not only which next (lower) level nodes will receive the push, but also the content level each node will receive. The push filtering decision can be based on aggregate usage information at the lower level proxy or client nodes. A staging decision can be based on the filtering decision, the successful completion of the push to the selected lower level proxies/clients, object usage information and/or a staging decision on other nodes in the hierarchy. An efficient means to purge a staged object is also described.

2) U.S. Pat. No. 5,842,141 issued Nov. 24, 1998 discloses a method for operating a cellular telephone that includes a first step, executed in response to input from a user, of disabling the cellular telephone from receiving cellular telephone calls. A second step then periodically enables the cellular telephone to receive, store and display user-related messages from a network control channel. In one embodiment the step of disabling includes a step of de-registering the cellular telephone from the network, and the step of periodically enabling includes an initial step of re-registering the cellular telephone with the network. The step of disabling may include a step of reducing the power consumption of the cellular telephone. In accordance with a further aspect of this reference the step of periodically enabling includes an initial step of requesting the network to assign the cellular telephone to a predetermined paging frame class that insures that the cellular telephone will receive a paging message from the network every n seconds. The step of periodically enabling thus further includes the step of placing the cellular telephone in a low power mode of operation for n-x seconds, where x is a period of time at least equal to a time required to resynchronize the cellular telephone to the network control channel.

3) U.S. Pat. No. 6,311,206 issued Oct. 30, 2001 discloses a method and a computer program device for pushing data from at least one source entity to at least one client entity over a network, a client entity being characterized as having a particular operating state. The method and computer program device comprise the steps of: transferring data from the at least one source entity to a push proxy entity for subsequent transmission of the data to the client entity; requesting a notification regarding the particular state of the client entity; monitoring a state of the client entity until the client entity is in the particular operating state and sending a notification communicating the state to the push proxy entity; and transferring data to the client entity in response to receiving the notification. The state notification may specify push information, which may be used to determine a least expensive device to which to transfer given data. The state notification also reduces the network-polling load by initiating each poll.

None of the prior art discloses a wireless mobile terminal allowing users to control reception of location based push type transmissions in a short range communication system using a menu driven interface in a non-technology oriented way via a dedicated page or application that controls internally the terminal settings for receiving or excluding push type data and executable code.

SUMMARY OF INVENTION

A wireless mobile terminal allows users to control receiving of location based push-type transmissions in a short-range communication system. A menu driven user interface enables a user to easily control receiving location based push-type RF transmissions. A dedicated page or application is generated that controls internally the terminal settings for receiving or excluding push type data and executable code. The terminal includes an antenna, transceiver, modulator/demodulator, controller, storage device, input/output device including a display and is air-linked to a push server via an access point, gateway or other device using e.g. Wireless Access Protocol (WAP), Wireless Personal Area Network (WPAN), etc. The storage area includes an operating program, application programs and a preference profile for generating dedicated push pages to receive push content from a push server (s). The settings and content of the pages can be entered into the preference profile by way of an application program. The settings include, discoverable [yes] [no]; connectable [yes] [no]; encryption [required] [not required]; authentication [required] [not required] and categories of interest to the user for location based push content. Once the settings are established in the preference profile for receiving text, pictures, sound, animation, etc., a related page can be created and stored in the memory for access by the user. The preference profile is used to generate each push page for receiving push information. The page may contain an optional menu of push filtering options, e.g. topic, source, etc available for selection by the user. Also the message priority can be an additional filtering criterion, for example advertisements may be considered to be a low priority while emergency messages could be considered as high-priority. When a simple menu driven interface is displayed and a selected push page displayed, the related push content, if available at the push server, can be delivered to the terminal via a Wireless Access Protocol (WAP) session for viewing by the user. Push content can be saved to a "sandbox" partition in the storage device. The "sandbox" stores executable code and other data in a region of the storage device separated from other code and data stored in the storage device, thus ensuring the sandbox code does not perform malicious actions to data received from other sessions. A pointer may be added to a session history for later review or deletion of the content in the sandbox. Upon termination of the WAP session, the push page can be set to non-discoverable.

An aspect of the invention is a wireless user terminal having a menu driven user interface displaying dedicated push message pages to provide users an easy tool to control push-type information flow to the terminal.

Another aspect is a preference profile stored in the terminal and responsive to the user for generating dedicated push pages related to discoverability; connectablility encryption and authentication requirements for receiving push information in selected categories or topics of interest to the user.

Another aspect is a dedicated push page generated by a preference profile for identifying push page information of interest to the user, the page providing all the discoverability, connectability, encryption and authentication settings necessary for the user to be connected to a push server to receive push information in Wireless Access Protocol (WAP) session.

Another aspect is a storage device within the terminal maintaining a set of dedicated push pages wherein the page(s) is/are are used when receiving location based push-type transmissions by the terminal.

Another aspect is a controller activating a short range RF transceiver module responsive to a dedicated push page for receiving certain location based push-type transmissions from an access point or gateway in response to user selection of the dedicated push page.

Another aspect is a sandbox memory separated from other memory content in the storage device, the sandbox storing executable code and other data and enabling a user to review/delete location based push type content received from the push server.

Another aspect is an application program stored in the terminal and enabling a user to enter settings into a preference profile for generating dedicated push pages.

DESCRIPTION OF DRAWING

The invention will be further understood from the following description of a preferred embodiment taken in conjunction with the appended drawings.

DESCRIPTION OF PREFERRED EMBODIMENT

In the following description of the preferred embodiment, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

The invention is best suited in situations where the push-type transmissions are Bluetooth transmissions. However, the invention is applicable in other wireless networks including the IEEE 802.11 Wireless LAN Standard and the HIPERLAN Standard. Examples include the IEEE 802.15 Wireless Personal Area Network (WPAN) standard, the infrared Data Association (IrDA) standard, the Digital Enhanced Cordless Telecommunications (DECT) standard, the Shared Wireless Access Protocol (SWAP) standard, the Japanese 3rd Generation (3G) wireless standard and the Multimedia Mobile Access Communication (MMAC) Systems standard of the Japanese Association of Radio Industries and Businesses. A brief overview of Bluetooth is believed appropriate as background before describing the preferred embodiment.

Bluetooth is a short-range radio network, originally intended as a cable replacement. It can be used to create ad hoc networks of up to eight devices operating together. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer.

A connection between two Bluetooth devices is initiated by an inquiring device sending out an inquiry message searching for other devices in its vicinity. Any other Bluetooth device that is listening by means of conducting an inquiry scan will recognize the inquiry message and respond. The inquiry response is a frequency hop synchronization (FHS) packet containing all of the information required by the inquiring device to address the responding device. This information includes clock value of the sender (i.e., the responding device) and the sender's correct device access code. The access code includes the lower address part (LAP) and the upper address part (UAP) of the sender's Bluetooth Device Address (BD_ADDR), a unique, 48-bit IEEE address that is electronically engraved into each Bluetooth device.

Each Bluetooth device synchronizes transmit and receive data exchanges with other Bluetooth devices using its own real time clock counter or time of day counter. The clock counter has a 28 bit count which is reset to zero at power-on and free-runs thereafter, incrementing every half slot of 312.5 microseconds. The clock counter therefore defines a slot interval of 625 microseconds. The clock counter wraps approximately once per day. Every device has its own native free-running clock counter that controls the timing and operation of that device, referred to as "CLKN". If a device is operating as a master device, it controls the piconet using its own clock CLKN as its internal reference timing. If a device is operating as a slave device, then its timing must be exactly synchronized with that of the master in its piconet. To synchronize with the master, the slave device must add an offset value onto its own native clock CLKN to derive a new clock value "CLK" which is its estimate of the master's clock CLKN. If a device is operating as a master device, it creates an estimate clock value "CLKE", which is an estimate of the CLK in a slave device with which the master is establishing a connection, prior to the slave having become synchronized with the master. The lowest two bits of CLK are directly used to define the beginning of the slots and half-slots for transmitting and receiving packets. A master transmission in the connected state always starts when CLK=00, and a slave transmission in the connected state always starts when CLK=10. A finer synchronization can then be achieved by a device using the synchronization word in the received packets to re-align the timing.

The Bluetooth transceiver is a frequency-hopping spread-spectrum radio system operating over 79 radio frequency channels, each being one megahertz wide. The radio hops at a rate of 1600 hops per second, pseudo-randomly across all 79 of these frequencies. The residence interval for the radio remaining at any one frequency is the slot time of 625 microseconds per hop. The hop channel selection function is a mapping algorithm which follows a different sequence, depending on the link control state: [1] page or inquiry state; [2] page response or inquiry response state; [3] page scan or inquiry scan state; or [4] connection state. For a particular one of these four hop channel sequences, the current frequency in that sequence depends on the lower address part (LAP) and upper address part (UAP) of the supplied Bluetooth Device Address (BD_ADDR), and it depends on the current CLK value.

The inquiring device will become the master and the responding device will become the slave in the eventual piconet, if a connection is established. To establish a connection, the inquiring device must enter the page state. The inquiring/paging device uses the information provided in the inquiry response packet, to prepare and send a paging message to the responding device. The inquiring/paging device uses the estimated clock CLKE and access code of the responding device (i.e., the eventual slave device) to temporarily synchronize with it. Since the inquiring/paging device intends to be the master, it includes an assignment of an active member address (AM_ADDR) in the paging message. The paging message sent by the inquiring/paging device is also a frequency hop synchronization (FHS) packet containing all of the information required by the responding device to directly reply to the inquiring/paging device. This information includes clock value of the sender (i.e., the inquiring/paging device) and the inquiring/paging device's correct device access code. The responding device must be in the page scanning state to allow the inquiring/paging device to connect with it. Once in the page scan state, the responding device will receive the paging packet that provides the clock timing and access code of the inquiring/paging device. The responding device responds with a page acknowledgment packet. This enables the two devices to form a connection and both devices transition into the connection state. The inquiring/paging device that has initiated the connection assumes the role of a master device and the responding device assumes the role of a slave device in a new ad hoc network piconet, using the CLK clock timing and access code of the master device.

Each piconet has one master device and up to seven slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. Piconets support distributed activities, such as multi-user gateways to the Internet or to a content server, wherein one device serves as the access point and is connected to an infrastructure network or content server. A user's device that joins a multi-user gateway piconet, does so to enable its user to access the infrastructure network or content server.

To form ad hoc connections with push-based servers, the terminal is set as a dedicated slave or in other words the terminal is set "actively" passive and listens to inquiries of other terminals. Otherwise, if the terminal was seeking other Bluetooth devices and a push server was sending messages within its coverage, it is possible that the terminal could not communicate with the push-based server because both devices were actively seeking other Bluetooth (slave) devices.

Figure 1:
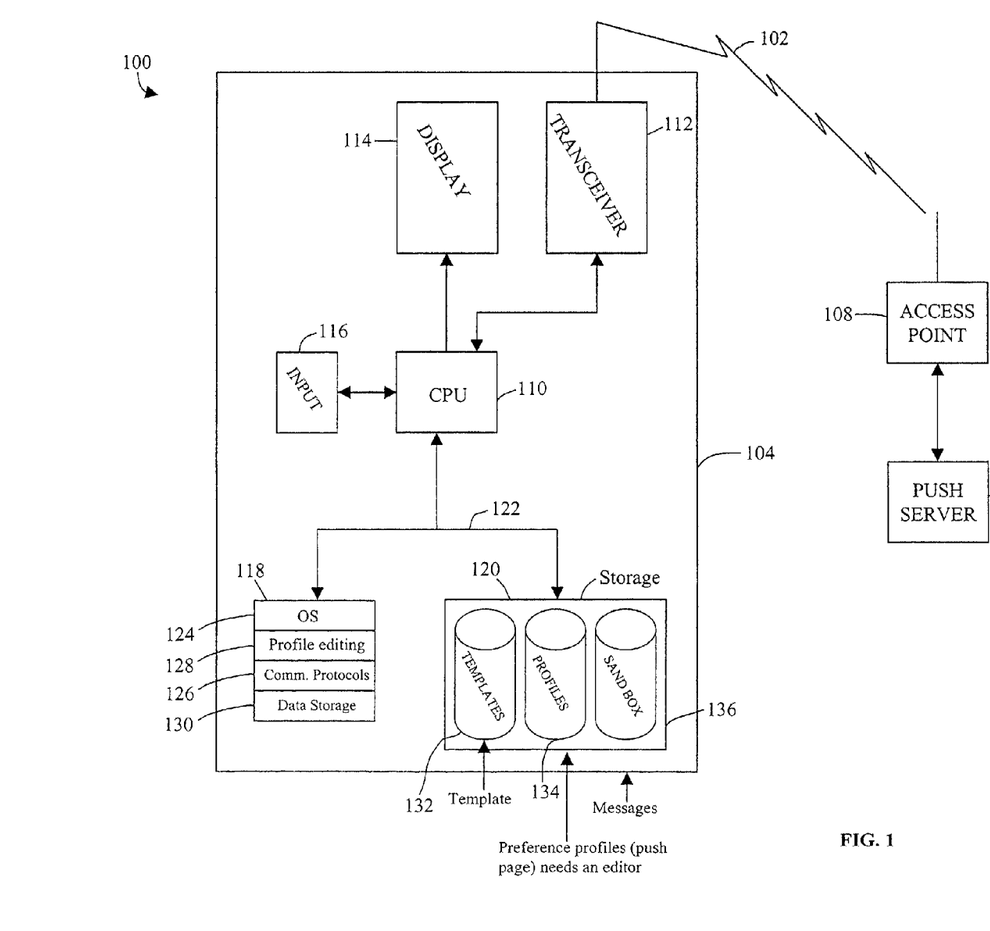
FIG. 1 is a representation of a terminal air linked to a push server in a short-range communication system and incorporating the principles of the present invention.

Now turning to FIG. 1, a push based information system 100 operating in a short-range communication network 102 includes a wireless terminal 104 linked to a push server 106, via an access point 108 served by the short-range communication network 102.

The terminal 104 is a hand-held device that includes a CPU 110 linked to the access point 108, via a transceiver 112. The CPU is coupled to a display 114 and services an input device 116. A memory 118, typically a dynamic random access memory and a storage device 120 are coupled to the CPU, via a bus 122.

The memory has stored programs, including an operating system 124, communication protocol 126, an application 128 for generating dedicated push pages via a preference profile and editing dedicated push pages and a data storage area 130. The operating system 124 is a standard program available from Microsoft, for example, Windows 98 or the like from other suppliers of operating systems. The communication protocol 126 is described in the Bluetooth specification, supra, but may also involve other protocols, including, IEEE 802.11 and the like. The profile generating and editing software 128 will be described in conjunction with FIGS. 2A, B and C.

The storage medium 120 includes a preference profile template 132 used for generating dedicated push pages related to the user's interest in receiving push-based information. The template will be further described in conjunction with FIG. 2A. A profile database 134 stores dedicated push pages generated by the template where the pages relate to the user's interest in push-based information. The pages are selected by the user via a menu driven interface 200 (See FIG. 2B) and displayed for receiving push-base information. related to the page. The dedicated push pages will be described in conjunction with FIG. 2C. A "sandbox" 136 receives and stores push-base messages for later recall and will be further described in conjunction with FIG. 3.

Figure 2:
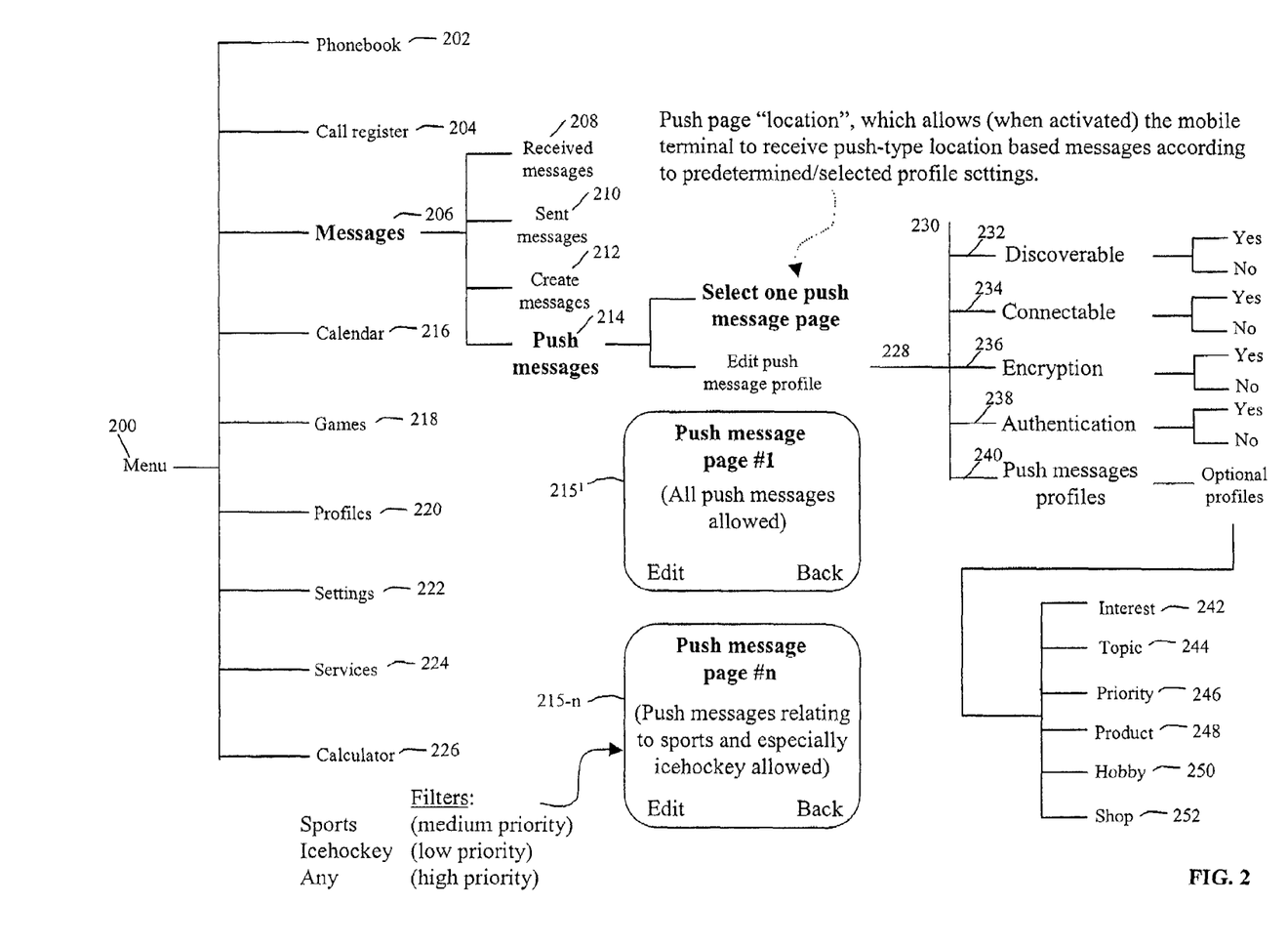
FIG. 2 is a representation of an exemplary architecture for a menu driven interface according to one embodiment of the present invention for processing message, including push messages, based upon dedicated push pages generated from a preference profile stored in the terminal.

FIG. 2 describes an exemplary architecture for a menu driven interface 200 according to one embodiment of the present invention for processing push message pages from a push server according to dedicated push pages generated from a preference profile template which enables the user to describe the terminal settings for receiving the push information. The interface 200 is displayed to the user and includes a plurality of categories for terminal operations. The menu enables the user to display phone book information 202 related to other users of interest to the user. A call register 204 stores calls received by the user for reference purposes. Message category 206 enables the user to view received messages 208, sent messages 210, create messages 212 and process push message pages 214. The menu further includes a calendar 216, a list of games 218 with which the user may interact, and a list of dedicated page profiles 220 for editing purposes. A setting category 222 enables the user to change the settings of the terminal for discoverability, connectability and the like. A service category 224 provides the user with a list of services available in a piconet based on the exchange of service discovery profiles among the terminals on the piconet. A calculator 226 is available to the user, as well as other categories, which may be included in the interface at the option of the user.

A push message 214, described hereinafter in FIG. 2D, will be processed when a dedicated push page is selected and a screen 215-1 . . . 215-N displays the push message matching with the user selected dedicated push page 228 stored in the database 136 (see FIG. 1), as will be described in FIG. 3. The screen includes filters to accept all push messages or messages relating to subjects of interest to the user, as related to dedicated push pages in storage 136. An interest priority is applied for storage purposes to the push information, which matches the dedicated user page. The screens 215-1 . . . 215-N include standard edit and back functions.

Figure 2A:
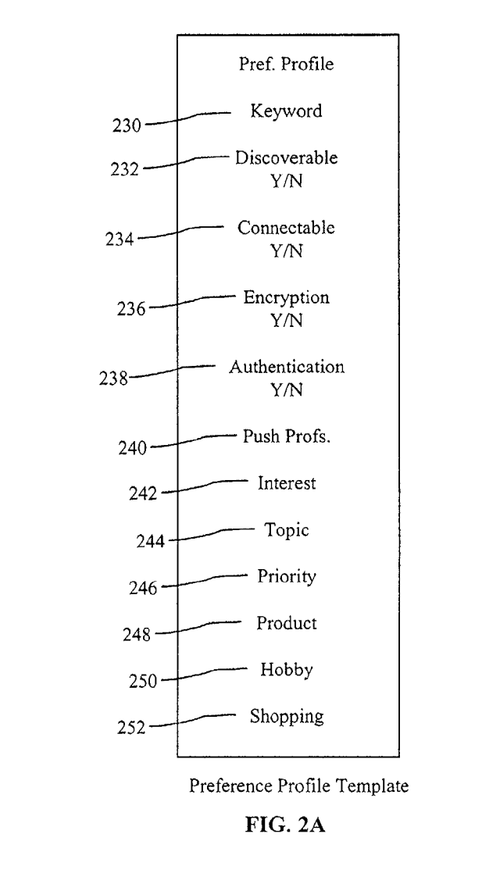
FIG. 2A is a representation of an exemplary preference profile stored in the terminal of FIG. 1 for generating dedicated push pages including all setting necessary for receiving push information according to the dedicated push page.

In FIG. 2A, an electronic template 132 stored in a storage device generates a preference profile by the user executing the profile editing program 128 (See FIG. 1) and entering data into the template related to each dedicated push page. The entered data for each push page includes: (a) an identification of the dedicated page via a keyword 230; (b) an indication of page discoverability 232 by a designation yes or no; (c) a designation of page connectability 234 by an indication of yes or no; (d) a designation of push message encryption 236 by an indication of yes or no; (e) a designation of push message authentication 238 by an indication yes or no and a push message profile 240 for matching the dedicated page to the push message. The profile 240 covers a wide variety of subjects including user interests 242, topics 244 of interest to the user, priorities 246 of subject matter, products 248 of user interest 248, user hobbies 250; and a user shopping list 252. The profile subject matter can be extended or reduced according to the user requirements.

Figure 2B:
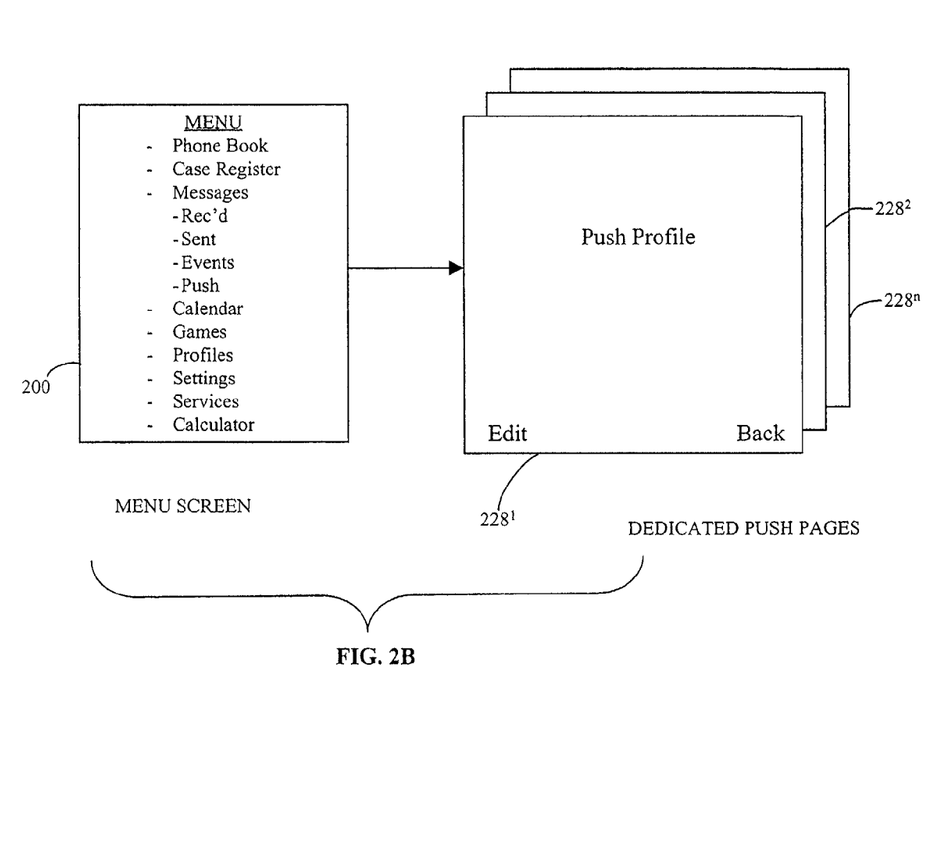
FIG. 2B is a representation of a menu driven interface displayed in the terminal of FIG. 1.

FIG. 2B shows the menu driven interface page 200 listing the categories for user selection and the dedicated push pages 228-1 . . . 228-N generated from the template 134.

Figure 2C:
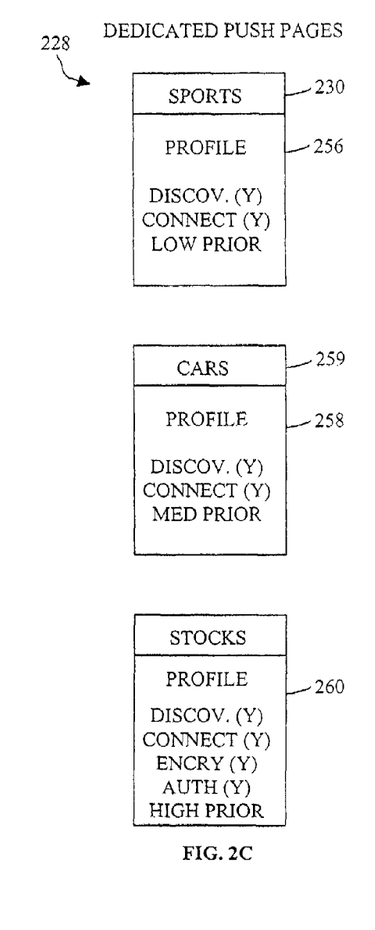
FIG. 2C are representations of user selected "dedicated push pages" based upon entries made in the preference profile by the user for controlling the reception of push based information.

FIG. 2C show examples of dedicated push pages. A page 256 may be dedicated to the user's interest in sports by incorporating a keyword 230. The page 256 will indicate in a content area the extent to which the user has an interest in a sport, e.g. ice hockey, soccer, skiing, etc and select Y for the discoverability 232 and connectability 234 of the page for receiving push information related to sports. A time of arrival would also be included in the message A priority would be assigned to the page for retention in the sandbox 136 (see FIG. 1). When the sandbox becomes filled, incoming messages will overwrite those messages of lesser priority. Of course, if the sandbox is filled and the incoming message is of a lower priority than the stored message, then the incoming message would be dropped. Where the incoming message and the stored message were of the same priority then the stored message with the earliest time of arrival would be dropped.

A second push page 258 could relate to automobiles or cars by incorporating the term CARS as a keyword identifier 259. The content of the page would indicate the type, model and cost of interest to the user. The discoverability, connectability and a priority would be included in the page.

A third dedicated page 260 could relate to stocks by incorporating a keyword identifier STOCKS. The page content would indicate the stock symbol(s) in which the user was interested. Besides the discoverability and connectability settings in the page, the user may wish to have the push information related to stocks of interest encrypted and authenticated before viewing by the user. A priority would be applied to the page and in most cases would probably be of high priority to avoid loss of the information.

Figure 2D:
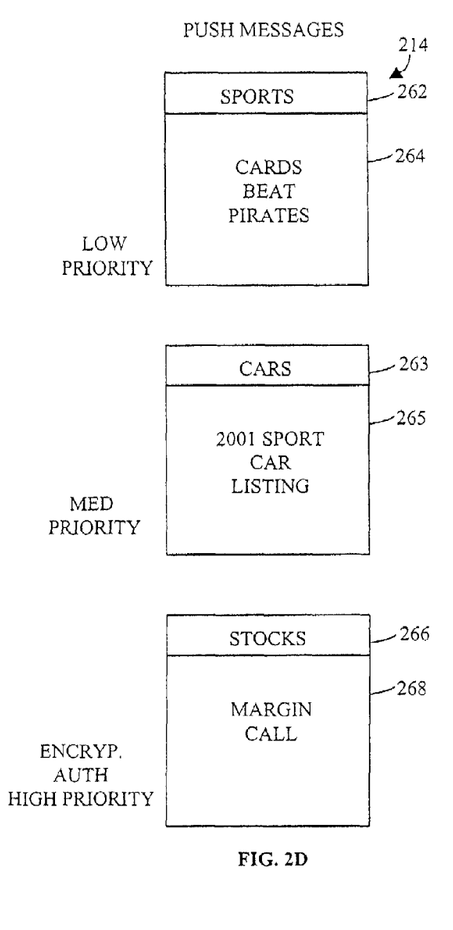
FIG. 2D is a representation of push page messages for matching with the selected dedicated push pages of FIG. 2C to deliver push page information contained in the message.

FIG. 2D shows an example of a push message 214, accepted by the terminal, when a keyword identifier 262, e.g. SPORTS. and message content 264 matches the keyword identifier and content of the dedicated page. The push message 264 would be viewed by the user and stored in the sandbox at the priority level indicated in the dedicated push page 256.

FIG. 2D shows another push page message 266, relating to stocks. The message would received and be viewed if the message matches the dedicated push page 260 and was encrypted/authenticated, as required by the page. The message could include content 268 related to stock matter, e.g. "Margin Call" requiring a response by the user to the sender over the short-range communication network. The message would be stored in the sandbox at the priority level indicated in the dedicated push page.

A feature of the invention is to make controlling of receiving of all push-type transmissions by the terminal as simple and easy as possible for the user via a User Interface (UI). When the user opens a certain application which may use/ profit of push-type messages, the setting of the terminal will change automatically (or upon user approval) to push-page state (enabling receiving of all/some of the push message depending on the application). When the user decides to close said application, also the push-enabled state will be terminated automatically (or upon user approval).

As an example: User enters a big shopping mall and selects push message page. (This can also be done automatically by an access point of the shopping mall if user has set the terminal into a mode allowing automatic push-page activation by remote devices.) The terminal enters a push-page mode and all kinds of push-type advertisements pop up on the terminal display while user moves around the shopping mall. User has his terminal on the side pocket of his jeans and is not aware of the messages, but when the user enters a sports shop, the user notices that there might be interest in roller skates and removes the terminal from his pocket. There are some ads on the terminal display and one ad advertises roller skates. Now, user selects the roller skates link and obtains more information of the roller skates which might motivate the purchase of the roller skates.

Another example: User upon entering into a shopping mall has decided to purchase roller skates. The user opens a "shopping" application and creates a push page that allows push messages related to roller skates to be received by the terminal which actually makes an alarm if such a message is received. The terminal is set to a filtered push-page mode and only push-type messages relating to roller skates are allowed to be received by the terminal display while user moves around the shopping mall. User has his terminal in the side pocket of his jeans and while wandering around the shops, has totally forgotten the roller skates. But when the user walks by a sport shop, the terminal makes an audible alert. The user notices the roller skates. The user removes the phone from the pocket. There are links on the display relating to roller skates. Now, user selects one of the roller skates link and obtains more information about the different features of different the roller skates. The user enters the shop and buys the best suitable skates.

Thus, the present invention provides a user ease of controlling parameters, which must be set when using connection technologies, e.g. Bluetooth. The user does not need to worry at all about different settings and options when it comes to connectability and receiving push content. A consistent approach to connectability based action eases the user understands of security issues when receiving and sending data. Innovative and rich services are available as content from the push pages, which can be loaded and run without a second thought that any executable code, could harm the terminal.

Figure 3:
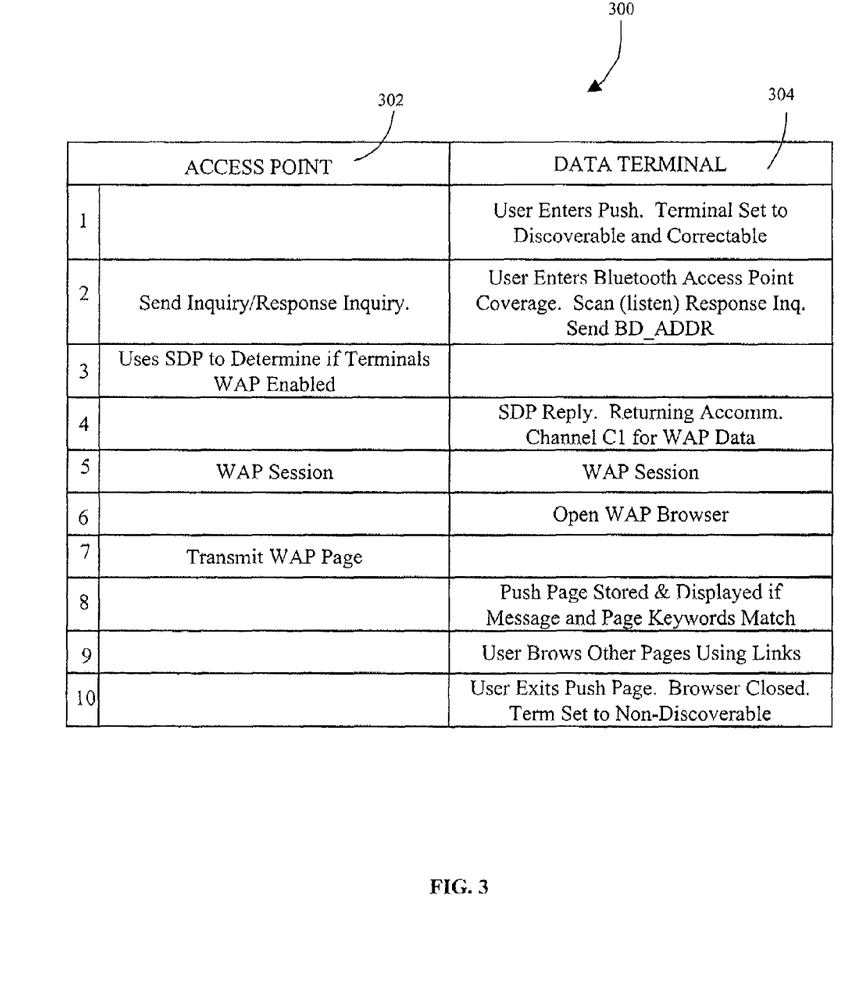
FIG. 3 is a flow diagram embodying the present invention for a terminal in a Bluetooth network receiving push-based transmission in a Wireless Access Protocol (WAP) session, the terminal having settings for automatically receiving push page information according to a dedicated push page(s) selected from the menu driven interface of FIG. 2B.

Now turning to FIG. 3, illustrating a flow diagram embodying the present invention, a description of a process 300 for controlling reception of push page information between an access point 302 and a short range radio enabled mobile data terminal 304, comprises the following steps:

Step 1: the user enters a selected push page at the terminal. The push page contains settings for Bluetooth discoverability and connectability to receive selected push information identified by a keyword in a push page message.

Step 2: the user enters the Bluetooth access point coverage, which transmits inquiry/inquiry response messages. The access point transmits inquiry messages. The terminal listens to the inquiry messages and transmits inquiry response messages including the terminal's BD_ADDR, a unique number used to identify the terminal.

Step 3: the access point uses Service Discovery Protocols (SDP) to determine if there are data terminals that are Wireless Access Protocol (WAP) enabled.

Step 4: the terminal returns a SDP reply providing the RFCOMM channel c1 for receiving WAP data.

Step 5: the access point initiates a WAP session with the terminal for sending push information. WAP sessions are described in the WAP standard and the WAP client/server architecture can be found in the book by Charles Arehart, et al. entitled, "Professional WAP", published by Wrox Press Ltd., 2000 (ISBN 1-861004-04-1).

Step 6: the terminal responds to the session and opens a WAP browser contained in the terminal.

Step 7: the access point transmits a push page message containing a push page.

Step 8: the push page is stored in a buffer for display provided the page message contains a keyword that matches the keyword of the user selected dedicated push page.

Step 9: the user browses a number of other pages by selecting links in the displayed push page.

Step 10: after the user closes the links, the user exits the push page which is stored in the sandbox on a priority basis, as described in FIG. 2. The browser is closed and the Bluetooth settings set to non-discoverable and non-connectable, and the process ends.

Summarizing, a dedicated page or application is generated in the terminal that controls internally the terminal settings for receiving or excluding push type data and executable code. When a user selects the page or starts an application, the terminal settings are automatically turned on and the user does not need to become involved in the different terminal settings and options for receiving push type information. Filters can be set in the dedicated page to limit the number of sometimes annoying push content or connection indications.

Although a specific embodiment of the invention has been disclosed, it will be understood by those having skill in the art that changes can be made to that specific embodiment without departing from the spirit and the scope of the invention.

I claim:

1. A wireless mobile terminal-comprising:
   a) a storage device within the terminal maintaining at least one dedicated push page, wherein each of the at least one dedicated push page comprises settings by the user for initiating location based push-type transmissions by the terminal or rejecting push pages from a host;
   b) a terminal user interface including at least one user selectable push message page based on the settings of the at least one dedicated push page maintained in the storage device, wherein each of the at least one user selectable push message page stored in the storage device is linked to a corresponding dedicated push page, wherein the settings include a set of keywords identifying information of interest to the user and allows only content identified by the keywords to be received by the short-range RF receiver, and matching a keyword identifier in a dedicated push page to a keyword identifier in a push information message; and
   c) a controller communicating with the storage device for activating a short range RF transceiver module by effectuating settings of a selected dedicated push page to enable directly receiving of selected location based push-type transmissions by the terminal in response to the user selecting a respective dedicated push message page by entry in the terminal user interface.

2. The wireless mobile terminal of claim 1 further comprising:
   d) an application program stored in the storage device enabling the user to enter settings into a dedicated push page.

3. The wireless mobile terminal of claim 1 further comprising:
   e) a sandbox memory separated from other memory content in the storage device, the sandbox storing executable code and other data thereby enabling the user to review or delete location based push type content received from a push transmission source; whereby the user does not need to set the terminal to accept or reject location based push-type content.

4. A Mobile terminal, comprising:
   a) an antenna for receiving location based push-type short-range transmissions from a push transmission source;
   b) a storage device in the terminal for storing dedicated push pages defining discoverability and connect ability settings initiating or rejecting host location based push information;
   c) an application program stored in the storage device linking push page messages with dedicated push pages stored in the mobile terminal and enabling a user to enter the user settings into the dedicated push pages, wherein the settings include a set of keywords identifying information of interest to the user and allows only content identified by the keywords to be received by the short-range RF receiver, and matching a keyword identifier in a dedicated push page to a keyword identifier in a push information message; and
   d) dedicated push pages stored in the storage device for display to the user initiating or rejecting location based push-type messages based upon the user selectable settings of the dedicated push page, and directly receiving content from the push transmission source.

5. The terminal of claim 4 further comprising:
e) a sandbox memory in the memory separated from other memory content in the storage device, the sandbox storing executable code and other data and enabling the user to review/delete location based push type content received from the push transmission source whereby the user does not need to set the terminal to accept or reject location based push-type content.

6. The terminal of claim 4 further comprising:
f) an electronic template responsive to user input via an application program for generating dedicated push pages.

7. The terminal of claim 4 further comprising:
g) a keyword identifier included in the dedicated push page for identifying push information for display to the user.

8. The terminal of claim 4 further comprising:
i) a priority classification indicator included in the dedicated push page for storage retention purposes in a sandbox memory.

9. The terminal of claim 4 further comprising:
j) a menu driven interface providing categories of operation for controlling reception of push information in a short range communication system via settings.

10. The terminal of claim 4 further comprising:
k) Filter means prioritizing push message pages for reception of push information; and
l) a dedicated default push page allowing reception of all push-type messages.

11. The terminal of claim 4 further comprising:
m) means alerting the user when a proper location based push message is received.

12. The terminal of claim 4 further comprising:
n) means for receiving push message pages from a push transmission source, the pages including links to other push message pages.

13. A process comprising:
a) storing in a mobile terminal dedicated push pages based on preference profiles for receiving push messages;
b) setting the mobile terminal to directly receive push information from a push server based upon user selectable settings contained in the dedicated push pages, wherein the settings include a set of keywords identifying information of interest to the user and allows only content identified by the keywords to be received by the short-range RF receiver, and matching a keyword identifier in a dedicated push page to a keyword identifier in a push information message;
c) listening for inquiries from an access point linked to the server while the mobile terminal is within the coverage area of the access point;
d) transmitting an inquiry response directly to the access point from the mobile terminal including the mobile terminal address; and
e) entering into a data session directly with the access point.

14. The process of claim 13 further comprising:
f) including a keyword identifier in the push page identifying push information of interest to the user.

15. The process of claim 13 further comprising:
g) receiving directly from the access point push information including a keyword identifier of push information content.

16. The process of claim 15 comprising:
h) matching in the mobile terminal the keyword identifier in the push information to the keyword identifier in the dedicated push page.

17. The process of claim 16 further comprising:
i) displaying in the mobile terminal the push information where the keyword identifiers match, otherwise rejecting the push information where the keyword identifiers do not match.

18. The process of claim 13 further comprising:
j) storing in the mobile terminal the push information in a memory for subsequent retrieval by the user.

19. The process of claim 18 further comprising:
k) prioritizing push information stored in a memory according to a priority setting in the dedicated push page.

20. The process of claim 13 further comprising:
l) incorporating in the mobile terminal a setting in the dedicated push page related to the discoverability of the terminal for receiving push information.

21. The process of claim 13 further comprising:
m) incorporating in the mobile terminal a setting in the dedicated push page related to the connect ability of the terminal for receiving push information.

22. The process of claim 13 further comprising:
n) incorporating in the mobile terminal a setting in the dedicated push page related to encryption of push information received by the terminal.

23. The process of claim 13 further comprising:
o) incorporating in the mobile terminal a setting in the dedicated push page related to authentication of push information received by the terminal.

24. The process of claim 13 further comprising:
p) incorporating in the mobile terminal the dedicated push page profiles of subject matter of interest to the user.

25. The process of claim 13 further comprising:
q) forming in the mobile terminal an electronic template containing entries to related terminal settings and subjects of interest for selection by the user in generating dedicated push pages.

26. The process of claim 13 further comprising:
r) entering in the mobile terminal a selection of a dedicated push page via a menu driven interface for reception of push information related to the selected dedicated push page.

27. The process of claim 13 further comprising:
s) entering into a WAP session in the mobile terminal with the access point for the reception of push information.

28. The process of claim 13 further comprising:
t) opening a WAP browser in the mobile terminal for receiving and processing push information.

29. The process of claim 13 further comprising:
u) responding in the mobile terminal to a Service Discovery Protocol from the access point related to whether the terminal is WAP enabled.

30. The process of claim 13 further comprising:
(v) providing in the mobile terminal the access point a RFCOMM channel designation for reception of push information in a WAP session.

31. The process of claim 13 further comprising:
w) establishing in the mobile terminal a Bluetooth connection with access point based on the settings contained in the dedicated push page.

32. A storage readable medium containing program instructions, executable in a computer system, the storage readable medium comprising:

program instructions for storing in a mobile terminal message pages linked to dedicated push pages including usable selectable settings based on preference profiles, wherein the settings include a set of keywords identifying information of interest to the user and allows only content identified by the keywords to be received by the short-range RF receiver, and matching a keyword identifier in a dedicated push page to a keyword identifier in a push information message;

program instructions for setting the mobile terminal to directly initiate and receive push information from a push server based upon the user selectable settings contained in the dedicated push pages;

program instructions for listening for inquiries from an access point linked to the server while within the coverage area of the access point;

program instructions for transmitting an inquiry response to the access point including the terminal address; and program instructions for entering into a data session directly with the access point.

33. A wireless mobile terminal comprising:
a) a storage device within the terminal storing message pages linked to at least one dedicated push page, wherein each of the at least one dedicated push page comprises settings by the user for receiving and rejecting location based push-type transmissions by the terminal, said settings including a set of keywords identifying information of interest to the user and allowing only content identified by the keywords to be received;
b) a terminal user interface including at least one user selectable push message page based on the settings of the at least one dedicated push page maintained in the storage device, wherein each of the at least one user selectable push message page defines a corresponding dedicated push, wherein the settings include a set of keywords identifying information of interest to the user and allows only content identified by the keywords to be received by the short-range RF receiver, and matching a keyword identifier in a dedicated push page to a keyword identifier in a push information message; and
c) a controller communicating with the storage device for activating a short range RF transceiver module by effectuating settings of a selected dedicated push page to enable directly receiving of selected location based push-type transmissions by the terminal in response to the user selecting a respective dedicated push message page by entry in the terminal user interface.

34. A process comprising:
a) receiving location based push-type short-range transmissions from a push transmission source;
b) storing dedicated push pages defining discoverability and connect ability settings initiating or rejecting host location based push information, settings further including a set of keywords identifying information of interest to the user and allowing only content identified by the keywords to be received, wherein the settings include a set of keywords identifying information of interest to the user and allows only content identified by the keywords to be received by the short-range RF receiver, and matching a keyword identifier in a dedicated push page to a keyword identifier in a push information message;
c) linking push page messages with dedicated push pages enabling a user to enter the user settings into the dedicated push pages; and
d) displaying the dedicated push pages to the user initiating or rejecting location based push-type messages based upon the user selectable settings of the dedicated push page, and directly receiving content from the push transmission source.

* * * * *